(12) United States Patent
Soryal (10) Patent No.: US 11,334,954 B2
(45) Date of Patent: May 17, 2022

(54) IDENTIFICATION AND IMAGE CONSTRUCTION FOR SOCIAL MEDIA

(71) Applicant: AT&T Intellectual Property I, L.P., Atlanta, GA (US)

(72) Inventor: Joseph Soryal, Ridgewood, NY (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/846,848

(22) Filed: Apr. 13, 2020

(65) Prior Publication Data

US 2021/0319521 A1    Oct. 14, 2021

(51) Int. Cl.
   G06Q 50/00    (2012.01)
   G06N 20/00    (2019.01)
   G06F 3/0489   (2022.01)
   G08B 25/08    (2006.01)
   G06V 40/20    (2022.01)

(52) U.S. Cl.
   CPC .......... *G06Q 50/01* (2013.01); *G06F 3/04897* (2013.01); *G06N 20/00* (2019.01); *G06V 40/20* (2022.01); *G08B 25/08* (2013.01); *G06F 2203/04806* (2013.01)

(58) Field of Classification Search
   CPC ............... G06Q 50/01; G06F 3/04897; G06F 2203/04806; G06N 20/00; G08B 25/08; G06K 9/00335
   See application file for complete search history.

(56) References Cited

U.S. PATENT DOCUMENTS

| | | | |
|---|---|---|---|
| 2005/0156873 A1* | 7/2005 | Walter | H04L 51/04 345/156 |
| 2014/0101296 A1* | 4/2014 | Li | H04L 41/0813 709/221 |
| 2017/0206557 A1* | 7/2017 | Abrol | G06Q 30/0269 |
| 2018/0303397 A1* | 10/2018 | Krupat | A61B 5/0077 |
| 2019/0116473 A1* | 4/2019 | Constantinides | H04L 51/10 |
| 2021/0165842 A1* | 6/2021 | Segal | H04L 51/16 |

* cited by examiner

*Primary Examiner* — Roberto Borja
(74) *Attorney, Agent, or Firm* — Guntin & Gust, PLC; Mark Wilinski (57) ABSTRACT

A system may display a representative image of historical information associated with a social media account. In an example, an apparatus may include a processor and a memory coupled with the processor that effectuates operations. The operations may include receiving information during a period associated with a social media account, wherein the information comprises one or more keywords associated with an image, text, audio, or video of respective social media posts, and wherein the one or more keywords is determined based on computer image analysis or machine learning of the respective social media posts, based on the information, determining that a threshold amount of activity associated with the social media account corresponds with at least a representative image indicative of the activity during the period; and sending an alert that comprises the representative image.

17 Claims, 7 Drawing Sheets

IDENTIFICATION AND IMAGE CONSTRUCTION FOR SOCIAL MEDIA

BACKGROUND

The popularity of social networking sites such as Twitter®, MySpace®, LinkedIn®, etc., are increasing. Social networking sites allow a subscriber to share personal content and information, status, or location information.

This background information is provided to reveal information believed by the applicant to be of possible relevance. No admission is necessarily intended, nor should be construed, that any of the preceding information constitutes prior art.

SUMMARY

The disclosed subject matter may display a summary image of historical information associated with a social media account. In an example, an apparatus may include a processor and a memory coupled with the processor that effectuates operations. The operations may include receiving information during a period associated with a social media account, wherein the information comprises one or more keywords associated with an image, text, audio, or video of respective social media posts, and wherein the one or more keywords is determined based on computer image analysis or machine learning of the respective social media posts, based on the information, determining that a threshold amount of activity associated with the social media account corresponds with at least a representative image indicative of the activity during the period; and sending an alert that comprises the representative image This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

The disclosed subject matter may display a summary (e.g. representative) image of historical information associated with a social media account. An image, video, text, or audio may be generated to represent the social media account over a period.

Figure 1:
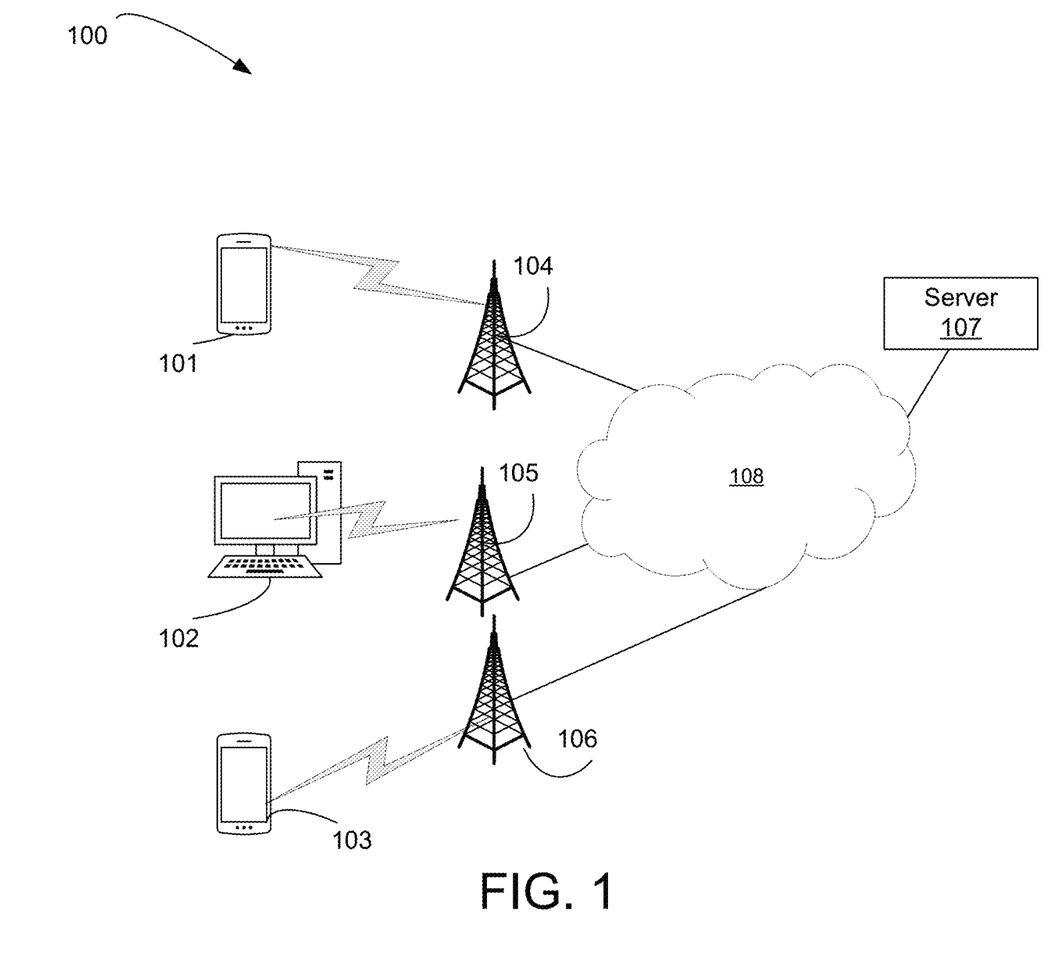
FIG. 1 illustrates an exemplary system 100 that may implement the subject matter disclosed herein, such as identification and image construction for social media, among other things.

FIG. 1 illustrates an exemplary system 100 that may implement the subject matter disclosed herein, such as identification and image construction for social media, among other things. System 100 may include network 108. Network 108 may communicate with or otherwise connect mobile device 101, device 102, mobile device 103, base station 104, base station 105, base station 106, or server 107. The devices of system 100 may be communicatively connected with each other. Mobile device 101 or mobile device 103 may include a laptop, desktop computer, tablet, autonomous vehicle (e.g., SAE Intl level 3 to level 5 automation), or mobile phone, among other things. Device 102 may include wireless or wired devices, such as servers, routers, switches, desktop computers, or the like. In an example, mobile device 101 may be associated with a first and second social medial platform, while mobile device 103 may be associated with just a third social media platform. Server 107, as shown, may process some or all of the steps of FIG. 2 or FIG. 4, herein.

With continued reference to FIG. 1, in an example, the information obtained (e.g., received) and analyzed (e.g., reconcile common accounts) by server 107 may include user login ID, social media account numbers, login location information, access point information for social media account, written post sentence structure, written post words, written post grammatical behavior, other written post information, website cookies, device related cookies, proximity of the used devices, user age, account age, educational background (e.g., schools or degrees), careers, number of social friends linked, likes (e.g., likes of activity, events, music, movies, or political campaign), login frequency, login times, usage behavior that may include number of chats/posts/reposts, domains, IP addresses, protocols, data flows, or the like that may be used for identification and image construction for social media as provided herein. Server 107 may obtain information from multiple sources. The information of server 107 may include information from mobile device 101, device 102, mobile device 103, base station 104, base station 105, base station 106, or the like.

Figure 2:
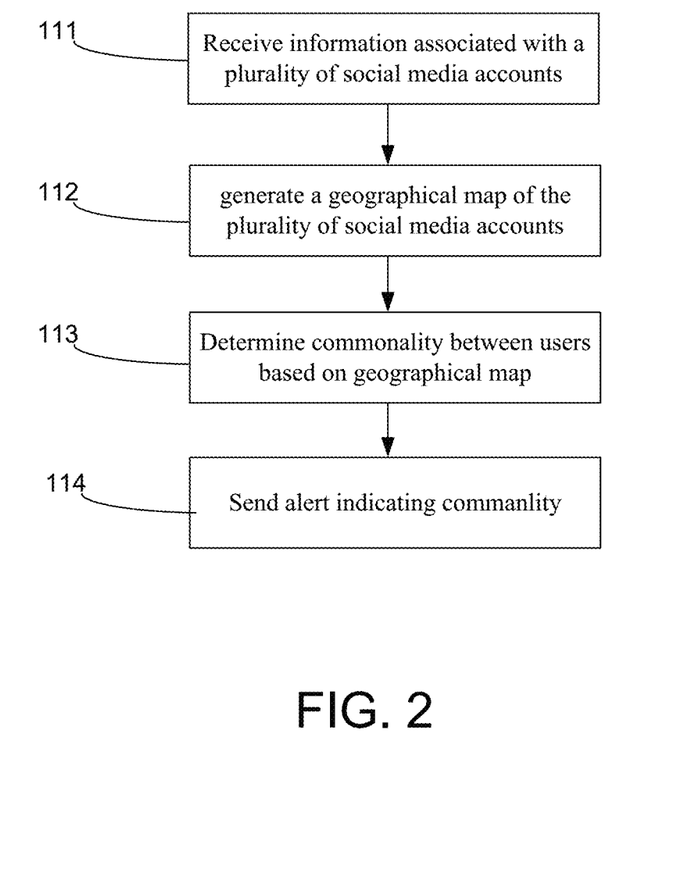
FIG. 2 illustrates an exemplary method for identification and image construction for social media.

FIG. 2 illustrates an exemplary method for identification and image construction for social media. At step 111, information, as described herein, associated with a plurality of social media accounts may be obtained. At step 112, based on the information of step 111, a geographical map (e.g., geographical map 127) of the plurality of social media accounts may be generated. The geographical map 127 (e.g., FIG. 3A) may indicate a routine usage of some or all of the plurality of social media accounts that are associated with one or more users. At step 113, based on comparing the geographical maps (and other information) associated with each social media account, commonality between users may automatically be determined by server 107. At step 114, an alert may be sent to indicate the likely commonality. This commonality may be used to streamline advertising, appropriately police users for misconduct, or appropriately suggest additional connections between accounts (e.g., friend suggestions), among other things.

With continued reference to FIG. 2, it is contemplated that information disclosed herein other than or in addition to location information may be used determine commonality between accounts. For example, style of written posts may be analyzed to find similarities in sentence structure, word use, or emoticons. The analysis may include frequency of use, locations in sentence, the order, or the number, among other things. It is also contemplated that the steps performed herein (e.g., steps 111-114) may be performed on one device (e.g., server 107 or mobile device 101) or multiple devices. A heat map may also be used based on the disclosed information to determine hot spots for social media platform usage (e.g., usage location heat map) or other parameters based on the disclosed information.

Figure 3A:
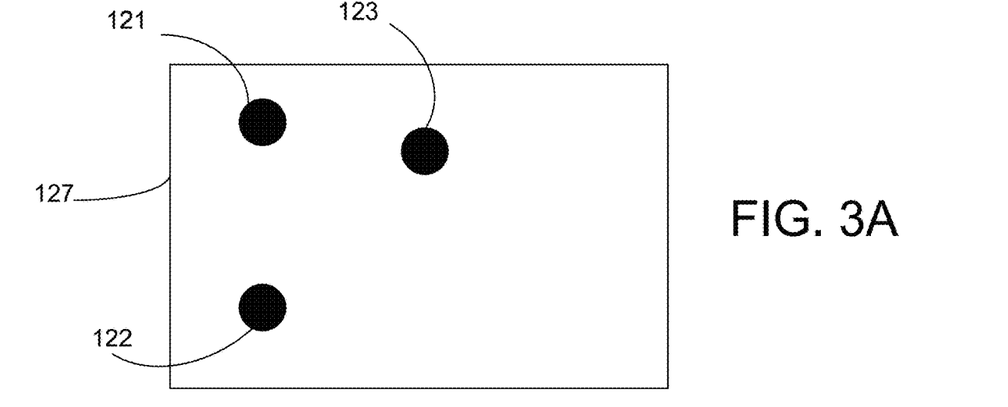
FIG. 3A illustrate an exemplary map associated with geographical positioning while accessing a social media account.
Figure 3B:
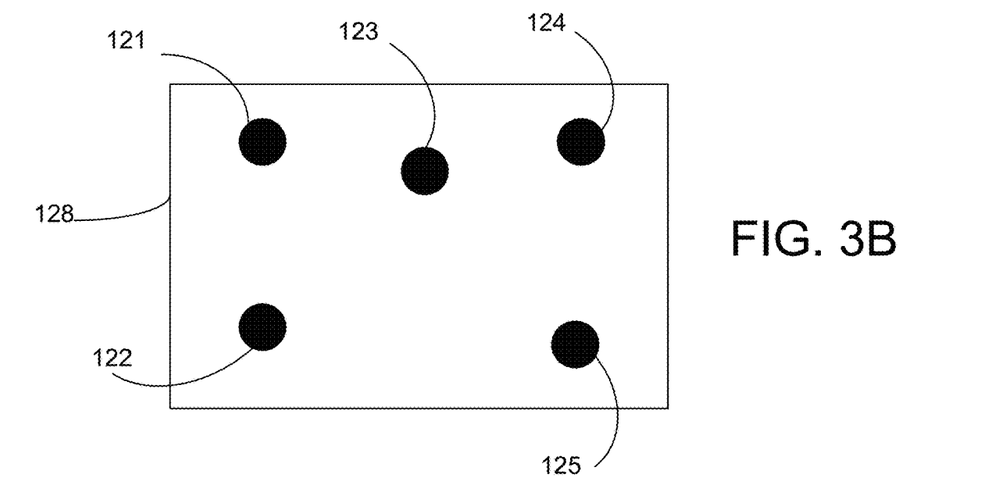
FIG. 3B illustrate an exemplary map associated with geographical positioning while accessing a social media account.
Figure 3C:
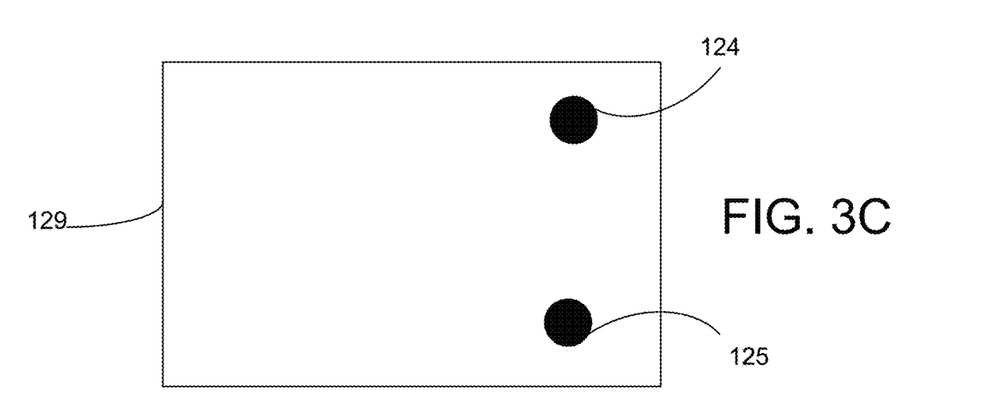
FIG. 3C illustrate an exemplary map associated with geographical positioning while accessing a social media account.

FIG. 3A-FIG. 3C illustrate exemplary maps associated with geographical positioning while using a social media account, such as posting to a social media platform or viewing a social media post. In an example, server 107 may have information that a social media account has been accessed at a certain location, but may determine whether multiple different accounts likely belong (or do not belong) to the same user. Table 1 provides example parameters that relate to FIG. 3A-FIG. 3C and may be used to determine whether multiple different accounts likely belong (or do not belong) to the same user. As can be observed from Table 1, there are three different user names in which two of the three user names are identical. Further, some of the locations and times for social media account usage overlap. Based on the information in Table 1 (and other information not shown in Table 1), a determination may be made that John Doe #1 and J-Art are the same user and a score (e.g., 95%) may be assigned to the accuracy of such determination. John Doe #3 may be determined to be a different user from the other two in Table 1.

TABLE 1

| # | User Name | Social Media Account Access Location | Approximate Social Media Daily Access Time | Social Media Platform |
|---|---|---|---|---|
| 1 | John Doe | Location 121, location 122, location 123 | 9 am, 12 pm, 5 pm | Platform #1 |
| 2 | J-Art | Location 121, location 122, location 123, Location 124 | 9 am, 12 pm, 5 pm, 9 pm | Platform #2 |
| 3 | John Doe | Location 124, Location 125 | 12 pm, 6 pm | Platform #2 |

Figure 4:
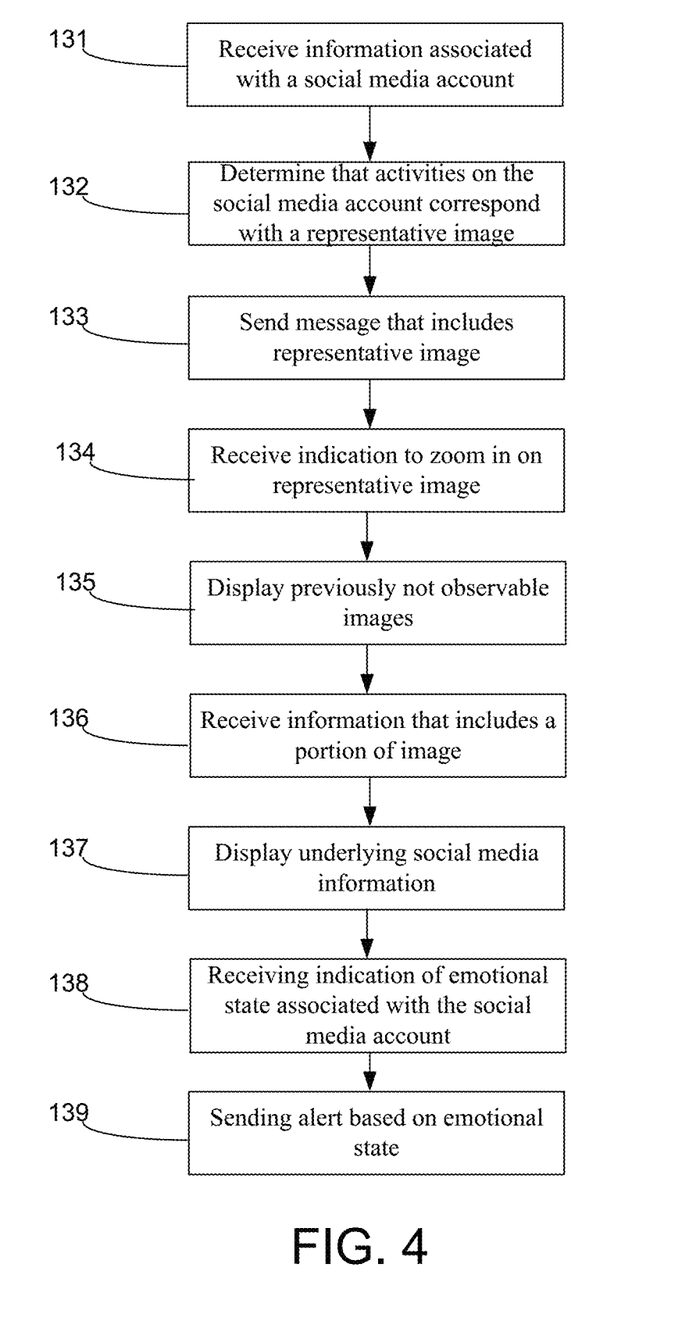
FIG. 4 illustrates an exemplary method for identification and image construction for social media.

FIG. 4 illustrates an exemplary method for identification and image construction for social media. As further described, a representative image may be constructed that provides a summarized story from historical posts, which may help more easily flag anomalies. At step 131, information associated with a plurality of social media accounts during a period may be obtained. As described herein, the information may include user login ID, account numbers, location information, hardware access point for social media account (e.g., historic), written post sentence structure, written post words, written post grammatical behavior, written post emoticons, website cookies, device related cookies, proximity of the used devices, user age, account age, educational background (e.g., schools, degrees), career, number of social friends, likes (activity, events, music, movies, political campaign), login frequency, login times, or usage behavior that may include number of chats/posts/reposts, among other things. With regards to hardware (e.g., mobile phone, server, or desktop computer), a record may be created to indicate when one device is used to log into different accounts. With regards to proximity of the used devices, the proximity information may include detected connections to the same cell towers and the detected constant proximity to the same group of user devices during a period.

With continued reference to step 131 of FIG. 4, the plurality of social media accounts may include multiple different social media platforms (e.g., Twitter® or LinkedIn®, among others). The information may include keywords, image indicators (e.g., indication of flower, dog, cat, smile, frown etc.), or video indicators (e.g., indication of flower, dog, cat, smile, frown etc.). The image or video indicators may be words that describe the persons, places, or things within the image or video. The image indicators or video indicators may be extracted from one or more images based on computer image analysis or machine learning. Computer image analysis may include image analysis or video techniques, such as 2D and 3D object recognition, facial image recognition, image segmentation, motion detection e.g. single particle tracking, video tracking, optical flow, 3D Pose Estimation, or automatic number plate recognition. With reference to machine learning, a machine learning module may query big data and Internet to correlate aspects (images, words, etc.) found in the profile on hand and get the emotional state based on online comparison (e.g., if a happy occasion, then people say "congratulations"). Similar analysis may be made for posted quotes or religious texts and ideologies. In another example, the determination of similarities (e.g., commonalities) and therefore corresponding descriptors of an image may be based on when or how the majority of people on internet use these texts, videos, or images, among other things.

With continued reference to FIG. 4, at step 132, based on the information of step 131, determining that one or more activities (e.g., posts, likes, or other usage) on a social medial account during the period corresponds with at least an image indicative of the activity during the period. A threshold amount of activity associated with the social media account may be the number of post associated with the keyword flower, pet, sports, or the like. In an example, in a period of a week there may be multiple photos of flowers and outdoor scenes, therefore the representative image indicative of the activity during the period may be a flower. See FIG. 5. An artificial intelligence (AI) module, which may use machine learning, may obtain images (commonly understood by the population) related to the determined activity. For example, the AI may identify keywords and identifying features from posts, images (e.g., photos or computer-generated images), or videos. The generated image may evolve with time to portray users interests, ideas, or a forecast of interests (which me based on other users historical posts).

At step 133, a message may be sent that includes the representative image. The sending of the image may include posting the first image to a news feed, displaying as a foreground or background picture, displaying as a main image on device (e.g., mobile device) as home screen wallpaper, or emailing the image, among other things.

At step 134, an indication to zoom in on the representative image may be received. At step 135, based on the indication to zoom of step 134, the representative image of step 133 may increase in size and display additional images or previously not observable (or generally not observable) images that are indicative of a more detailed description of the period (e.g., zoom from a month representative image to a representative image for a week of said month). It is contemplated herein that the opposite may be true when zooming out (e.g., from a month view to a year-to-date view).

At step 136, an indication of a selection of a portion of the image may be received. Any portion of the image (a petal of a flower) may be selected (e.g., mouse click or finger pressure on a touch interface). At step 137, based on the selection, underlying social media posts or other information may be displayed (e.g., on mobile device 101) that led the AI to generate the image. Note the image may be selected from a stock image or created with unique colors or lines for a unique customization.

At step 138, server 107 may obtain an indication that an emotional state threshold has been met, wherein the emotional state threshold is indicative of an emotional state. Emotional states may include fear, anger, sadness, joy, disgust, grief, or surprise, among others. The emotional state threshold may be determined by machine learning algorithms. At step 139, based on the emotional state threshold being met, sending an alert message to an authority device. The authority device may be associated with a public safety agency (e.g., police or fire). For example, any sudden changes may trigger an alarm (from overly happy to being sad)—the alarm may trigger deep inspection to correlate events for the reason of mood changes (e.g., death in the family), otherwise an alarm may be triggered. The public safety agency may be sent and further review the representative images associated with step 132. As disclosed, the representative images may allow for an observer (e.g., public safety official or friend) to quickly summarize a user's social media account activity.

Figure 5:
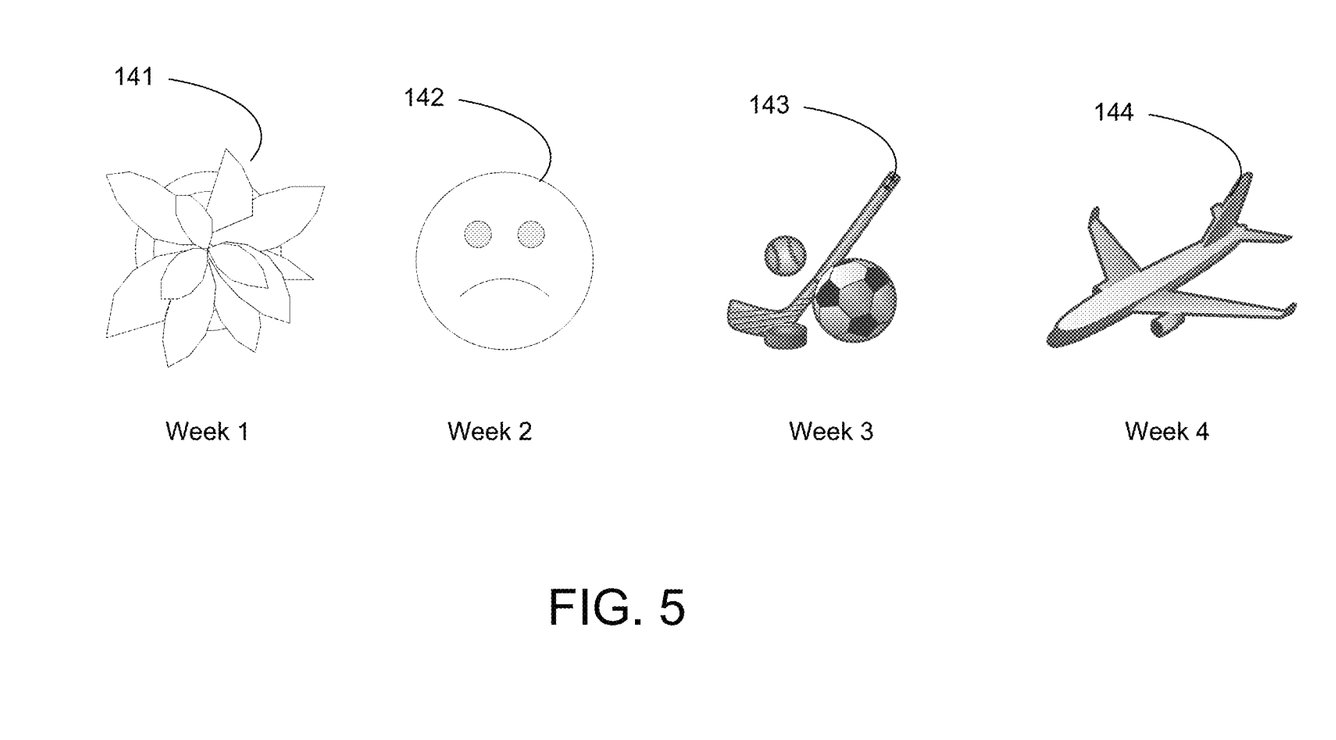
FIG. 5 illustrates exemplary representative images for identification and image construction for social media, as disclosed herein.

Further perspective is provided below with regard to identification and image construction for social media, as disclosed herein. The disclosed subject matter may allow for the visualization of historical information associated with a social media account. For example, server 107 may construct a graphical picture or video to represent the profile over a period. In the example, there may be a short length video in which the video time length or other features is configurable. As disclosed, information such as keywords in posts, songs, reshared articles, and key aspects of pictures may be chosen to help construct a representative image or a video. FIG. 5 illustrates exemplary representative images for identification and image construction for social media, as disclosed herein. In an example, during the first 4 days of the first week of March there may have been 6 out of 9 posts associated with gardening by a social media account. Therefore, flower 141 may be the representative image for the social media account. During the second week of March, there may have been sad emoticons and words related to a death (e.g., condolences) in the majority of the posts. Therefore, emoticon 142 may be the representative image for the social media account for a period during the second week. During the third week of March, there may have been a majority of liked posts by the social media account that are related to sports. Therefore, sports image 143 may be the representative image for the social media account for a period during the third week. During the fourth week of March, there may have been indications of locations that are abnormal and would usually be traveled to by plane in a significant number of the posts. Therefore, plane 144 may be the representative image for the social media account for a period during the fourth week, in which the plane may be indicative of extensive or abnormal travel. It is contemplated that the posts or other information may be scaled to have different weight over other posts (e.g., funeral post by the social media account may be weighted more than a "like" indication of another user's cat video).

Figure 6:
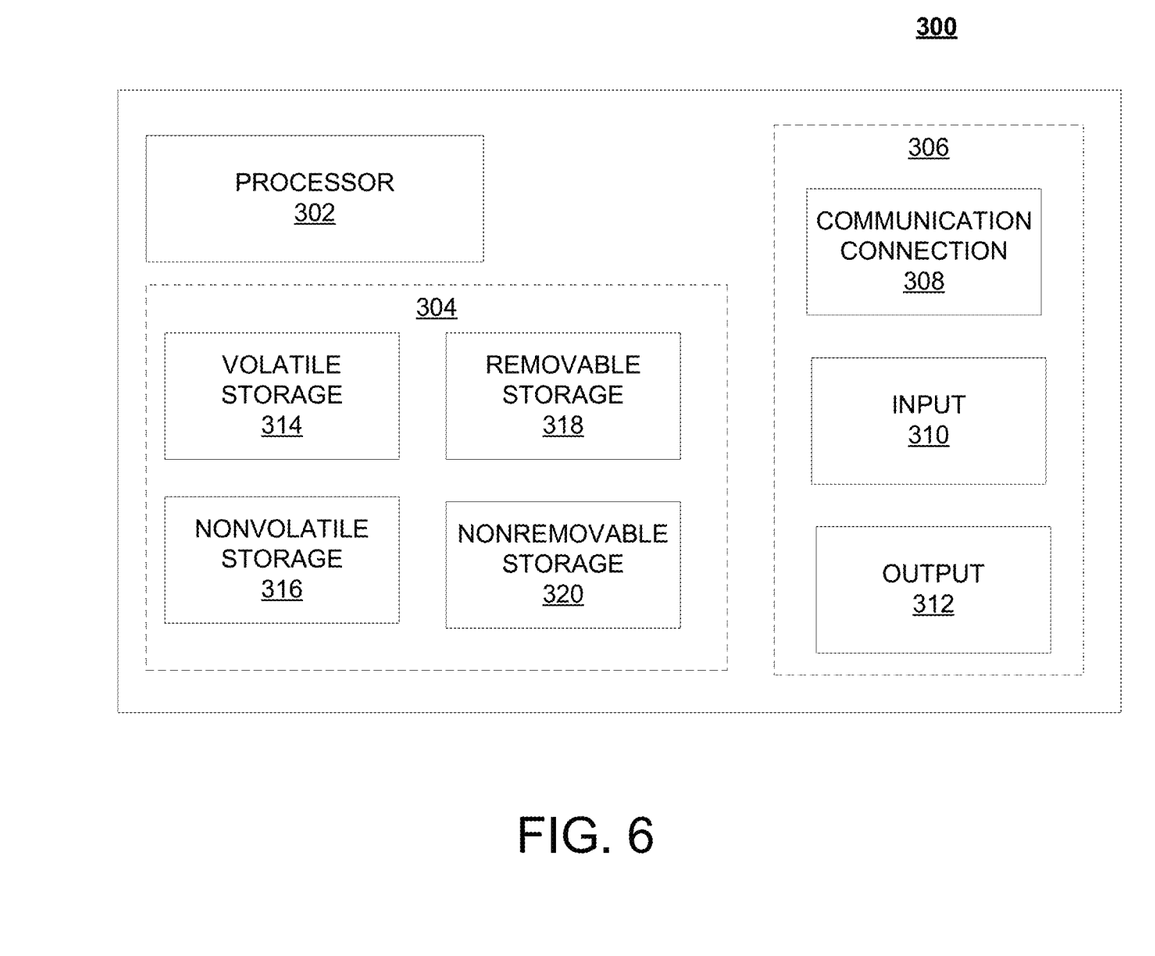
FIG. 6 illustrates a schematic of an exemplary network device.

FIG. 6 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 6 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 6 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 6) to allow communications between them. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 7:
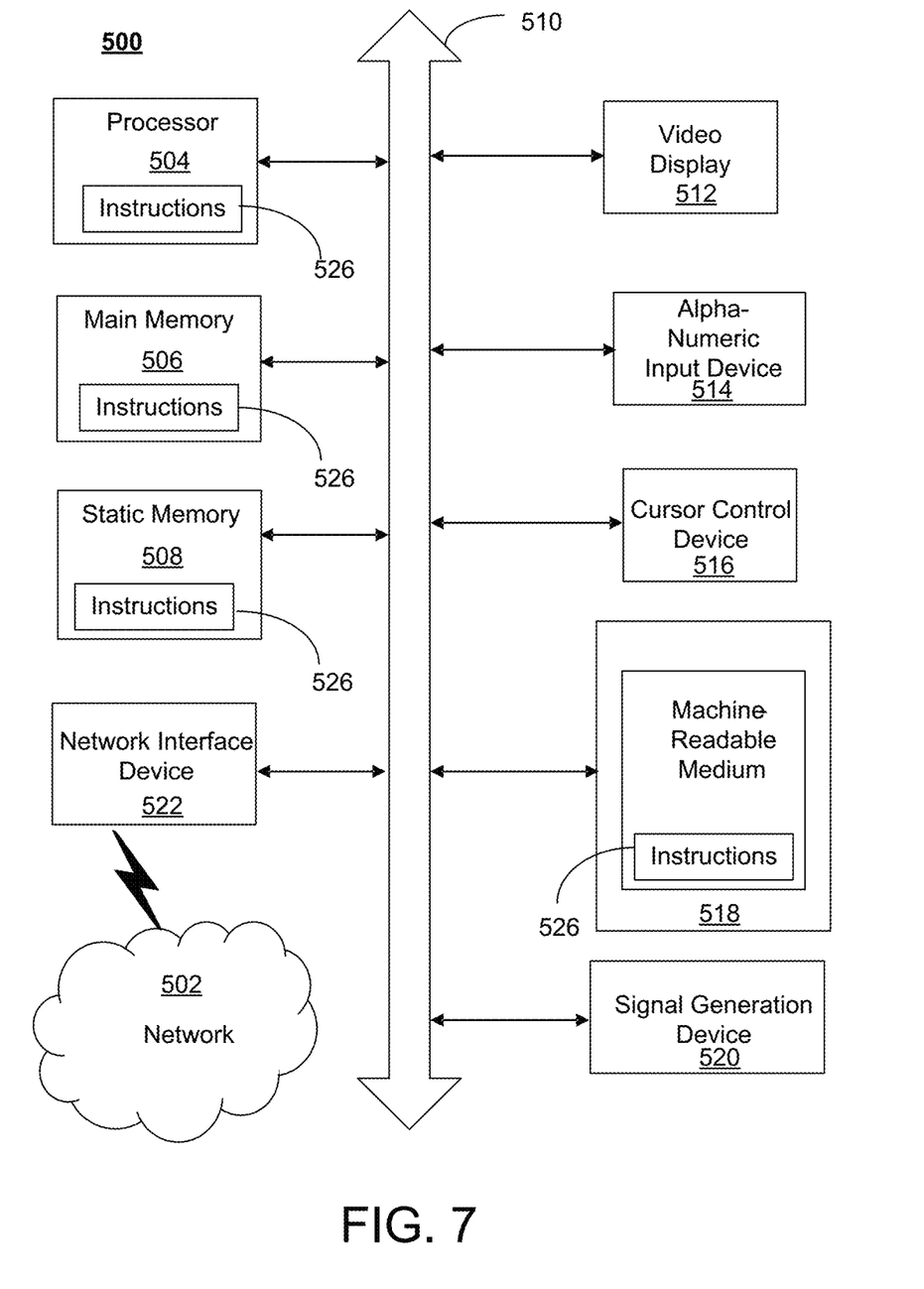
FIG. 7 illustrates an exemplary communication system that provides wireless telecommunication services over wireless communication networks.

FIG. 7 depicts an exemplary diagrammatic representation of a machine in the form of a computer system 500 within which a set of instructions, when executed, may cause the machine to perform any one or more of the methods described above. One or more instances of the machine can operate, for example, as processor 302, mobile device 101, mobile device 103, server 107, device 102, base station 104—base station 106, and other devices of FIG. 1. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system may utilize a software defined network (SDN). SDN and a simple IP may be based, at least in part, on user equipment, that provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a system in which alerts for identification and image construction for social media can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—identification and image construction for social media—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for identification and image construction for social media. A method, system, computer readable storage medium, or apparatus provides for obtaining (e.g., receiving) first information during a first period associated with a plurality of social media accounts, wherein the social media accounts comprise a first group of social media accounts from a first social medial platform and a second group of social media accounts from a second social media platform, wherein the first information comprises keywords which may be associated with images or videos, and wherein the keywords may be extracted from one or more images based on computer image analysis or machine learning; based on the first information, determining that a first threshold of activity of a first social media account corresponds with at least a first image indicative of the activity during the first period; and sending an alert that comprises the first image, wherein the sending the alert comprises posting the first image to a first social media account or displaying the first image on a device display. The method, system, computer readable storage medium, or apparatus may provide for obtaining an indication to zoom in on the first image; based on the indication to zoom in on the first image, altering the first image to be displayed at an increased size on the display; and displaying additional previously not observable images that are indicative of more detailed description of the of the first period. The method, system, computer readable storage medium, or apparatus may provide for obtaining an indication of a selection of a portion of the first image; and based on the indication of the selection of a portion of the first image, display posts or other information of the social media (e.g., account activity) that were used to determine the first image. The method, system, computer readable storage medium, or apparatus may provide for obtaining an indication that a second threshold has been met, wherein the second threshold is indicative of an emotional state; and based on the second threshold being met, sending an alert message to an authority device, wherein an authority device is associated with a public safety agency. All combinations in this paragraph (including the removal or addition of steps) are contemplated in a manner that is consistent with the other portions of the detailed description.

Methods, systems, and apparatuses, among other things, as described herein may provide for identification and image construction for social media. A method, system, computer readable storage medium, or apparatus provides for obtaining (e.g., receiving) first information during a first period associated with a plurality of social media accounts. The first information include user login ID, account #s, location information, hardware access point for social media account (historic), written post sentence structure, written post words, written post grammatical behavior, other written post information, website cookies, device related cookies, proximity of the used devices, user age, account age, educational background (schools, degrees), career, number of social friends, likes (activity, events, music, movies, political campaign), login frequency, login times, usage behavior that may include number of chats/posts/reposts, etc. The method, system, computer readable storage medium, or apparatus may provide for based on the first information, generating a geographical map of each social media account of at least a sub-group of the plurality of the social media accounts, wherein the geographical map indicates a routine for usage of one or more of the plurality of social media accounts that are associated with a first user; determining that the first user is a common user for multiple accounts of the plurality of social media accounts based on comparing the geographical maps of each social media account of the at least the sub-group of the plurality of the social media accounts (e.g., reconcile social media usage with the generated map); and providing an indication of the multiple accounts of the first user or an indication that the first user is the common user of the multiple accounts. In an example, an apparatus may include a processor and a memory coupled with the processor that effectuates operations. The operations may include receiving information during a period associated with a social media account, wherein the information comprises one or more keywords associated with an image, text, audio, or video of respective social media posts, and wherein the one or more keywords is determined based on computer image analysis or machine learning of the respective social media posts, based on the information, determining that a threshold amount of activity associated with the social media account corresponds with at least a representative image indicative of the activity during the period; and sending an alert that comprises the representative image. All combinations in this paragraph (including the removal or addition of steps) are contemplated in a manner that is consistent with the other portions of the detailed description.

What is claimed is:

1. An apparatus comprising:
   a processor; and
   a memory coupled with the processor, the memory storing executable instructions that when executed by the processor cause the processor to effectuate operations comprising:
   receiving information during a period associated with a social media account of a user, wherein the information comprises one or more keywords associated with an image, text, audio, or video of respective social media posts associated with the social media account, and wherein the one or more keywords are determined based on machine learning of the respective social media posts as compared to social media posts associated with other users;
   generating a representative image based on the information indicative of activity during the period;
   determining that a threshold amount of the activity associated with the social media account corresponds with at least the representative image;
   sending, based on the determining, an alert that comprises the representative image;
   generating a geographical map based on the information, wherein the geographical map identifies a first location of the user while using the social media account and a second location of at least one of the other users while using a second social media account; and
   determining, based on the generating of the geographical map, a commonality between the user and the at least one of the other users, wherein the alert indicates the commonality, and wherein the commonality of the alert is used to police the user and the at least one of the other users for misconduct and suggest connections between social media accounts;
   obtaining an indication that a second threshold has been met, wherein the second threshold is indicative of an emotional state; and
   based on the second threshold being met, sending an alert message to an authority device, wherein the authority device is associated with a public safety agency.

2. The apparatus of claim 1, the operations further comprising:
   receiving an indication to zoom in on the representative image;
   based on the indication to zoom in on the representative image, altering the representative image to be displayed at an increased size on a display; and
   displaying an additional or previously not observable image that is indicative of a more detailed description of the period.

3. The apparatus of claim 1, wherein the sending the alert comprises posting the representative image to a news feed of the social media account or displaying the representative image on a device display.

4. The apparatus of claim 1, the operations further comprising:
   receiving an indication of a selection of a portion of the representative image; and
   based on the indication of the selection of the portion of the representative image, displaying information during the period associated with the social media account, wherein the information during the period associated with the social media account comprises the one or more keywords.

5. The apparatus of claim 1, wherein the information during the period associated with the social media account comprises a social media post.

6. The apparatus of claim 1, wherein the information during the period associated with the social media account comprises location information associated with a social media post.

7. A system comprising:
   one or more processors; and
   memory coupled with the one or more processors, the memory storing executable instructions that when executed by the one or more processors cause the one or more processors to effectuate operations comprising:
   receiving information during a period associated with a social media account of a user, wherein the information comprises one or more keywords associated with an image, text, audio, or video of respective social media posts associated with the social media account, and wherein the one or more keywords are determined based on machine learning of the respective social media posts as compared to social media posts associated with other users;
   generating a representative image based on the information indicative of activity during the period;
   determining that a threshold amount of the activity associated with the social media account corresponds with at least the representative image;
   sending, based on the determining, an alert that comprises the representative images;
   generating a geographical map based on the information, wherein the geographical map identifies a first location of the user while using the social media account and a second location of at least one of the other users while using a second social media account; and
   determining, based on the generating of the geographical map, a commonality between the user and the at least one of the other users, wherein the alert indicates the commonality, and wherein the commonality of the alert is used to police the user and the at least one of the other users for misconduct and suggest connections between social media accounts;
   obtaining an indication that a second threshold has been met, wherein the second threshold is indicative of an emotional state; and
   based on the second threshold being met, sending an alert message to an authority device, wherein the authority device is associated with a public safety agency.

8. The system of claim 7, the operations further comprising:
   receiving an indication to zoom in on the representative image;
   based on the indication to zoom in on the representative image, altering the representative image to be displayed at an increased size on a display; and
   displaying an additional or previously not observable image that is indicative of a more detailed description of the period.

9. The system of claim 7, wherein the sending the alert comprises posting the representative image to a news feed of the social media account or displaying the representative image on a device display.

10. The system of claim 7, the operations further comprising:
   receiving an indication of a selection of a portion of the representative image; and
   based on the indication of the selection of the portion of the representative image, displaying information during the period associated with the social media account, wherein the information during the period associated with the social media account comprises the one or more keywords.

11. The system of claim 7, wherein the information during the period associated with the social media account comprises a social media post.

12. The system of claim 7, wherein the information during the period associated with the social media account comprises location information associated with a social media post.

13. A method comprising:
   receiving information during a period associated with a social media account of a user, wherein the information comprises one or more keywords associated with an image, text, audio, or video of respective social media posts, and wherein the one or more keywords are determined based on or machine learning of the respective social media posts as compared to social media posts associated with other users;
   generating a representative image based on the information indicative of activity during the period;
   determining that a threshold amount of the activity associated with the social media account corresponds with at least the representative image;
   sending, based on the determining, an alert that comprises the representative image;
   generating a geographical map based on the information, wherein the geographical map identifies a first location of the user while using the social media account and a second location of at least one of the other users while using a second social media account; and
   determining, based on the generating of the geographical map, a commonality between the user and the at least one of the other users, wherein the alert indicates the commonality, and wherein the commonality of the alert is used to police the user and the at least one of the other users for misconduct and suggest connections between social media accounts;
   obtaining an indication that a second threshold has been met, wherein the second threshold is indicative of an emotional state; and
   based on the second threshold being met, sending an alert message to an authority device, wherein the authority device is associated with a public safety agency.

14. The method of claim 13, further comprising:
   receiving an indication to zoom in on the representative image;
   based on the indication to zoom in on the representative image, altering the representative image to be displayed at an increased size on a display; and
   displaying an additional or previously not observable image that is indicative of a more detailed description of the period.

15. The method of claim 13, wherein the sending the alert comprises posting the representative image to a news feed of the social media account or displaying the representative image on a device display.

16. The method of claim 13, further comprising:
   receiving an indication of a selection of a portion of the representative image; and
   based on the indication of the selection of the portion of the representative image, displaying information during the period associated with the social media account, wherein the information during the period associated with the social media account comprises the one or more keywords.

17. The method of claim 13, wherein the information during the period associated with the social media account comprises a social media post.

* * * * *